United States Patent [19]
Pittner

[11] Patent Number: 4,574,049
[45] Date of Patent: Mar. 4, 1986

[54] REVERSE OSMOSIS SYSTEM
[75] Inventor: Gregory A. Pittner, Danville, Calif.
[73] Assignee: Arrowhead Industrial Water, Inc., Los Angeles, Calif.
[21] Appl. No.: 616,729
[22] Filed: Jun. 4, 1984
[51] Int. Cl.4 ............................................. B01D 13/00
[52] U.S. Cl. .................... 210/639; 210/641; 210/195.2; 210/433.2
[58] Field of Search ............ 210/639, 641, 259, 321.1, 210/206, 195.2, 433.2

[56] References Cited
U.S. PATENT DOCUMENTS

| | | | |
|---|---|---|---|
| T921,001 | 4/1974 | Devaney | 210/641 |
| 3,774,763 | 11/1973 | Yall et al. | 210/96 |
| 3,776,842 | 12/1973 | Grimme, Jr. | 210/259 X |
| 3,823,086 | 7/1974 | Schmidt | 210/23 |
| 4,014,787 | 3/1977 | Shorr | 210/639 |
| 4,046,685 | 9/1977 | Bray | 210/23 H |
| 4,115,274 | 9/1978 | Boddeker et al. | 210/346 X |
| 4,160,727 | 7/1979 | Harris, Jr. | 210/259 X |
| 4,188,291 | 2/1980 | Anderson | 210/23 H |
| 4,243,523 | 1/1981 | Pelmudder | 210/652 |
| 4,255,263 | 3/1981 | Galimi et al. | 210/321.1 |
| 4,261,833 | 4/1981 | Pohl et al. | 210/639 |
| 4,277,336 | 7/1981 | Henschel, Jr. | 210/167 |
| 4,289,617 | 9/1981 | Davis | 210/109 |
| 4,313,830 | 2/1982 | Tulin et al. | 210/639 |
| 4,332,685 | 6/1982 | Nowlin et al. | 210/638 |
| 4,434,057 | 2/1984 | Marquardt | 210/638 |

FOREIGN PATENT DOCUMENTS 0025265 3/1978 Japan ................................. 210/639

Primary Examiner—Frank Spear
Attorney, Agent, or Firm—George H. Gerstman

[57] ABSTRACT

A chemically enhanced reverse osmosis water purification system and process is provided in which the inlet of a second reverse osmosis unit is coupled in series to the product water outlet of a first reverse osmosis unit. Water to be purified is conditioned by an ion exchange resin type water softener and pumped to the inlet of the first reverse osmosis unit. The product from the first reverse osmosis unit is treated with a chemical treatment agent, such as a sodium hydroxide solution, upstream of the inlet to the second reverse osmosis unit. The brine from the brine outlet of the second reverse osmosis unit is recirculated to the water flow line upstream of the first reverse osmosis unit.

10 Claims, 1 Drawing Figure

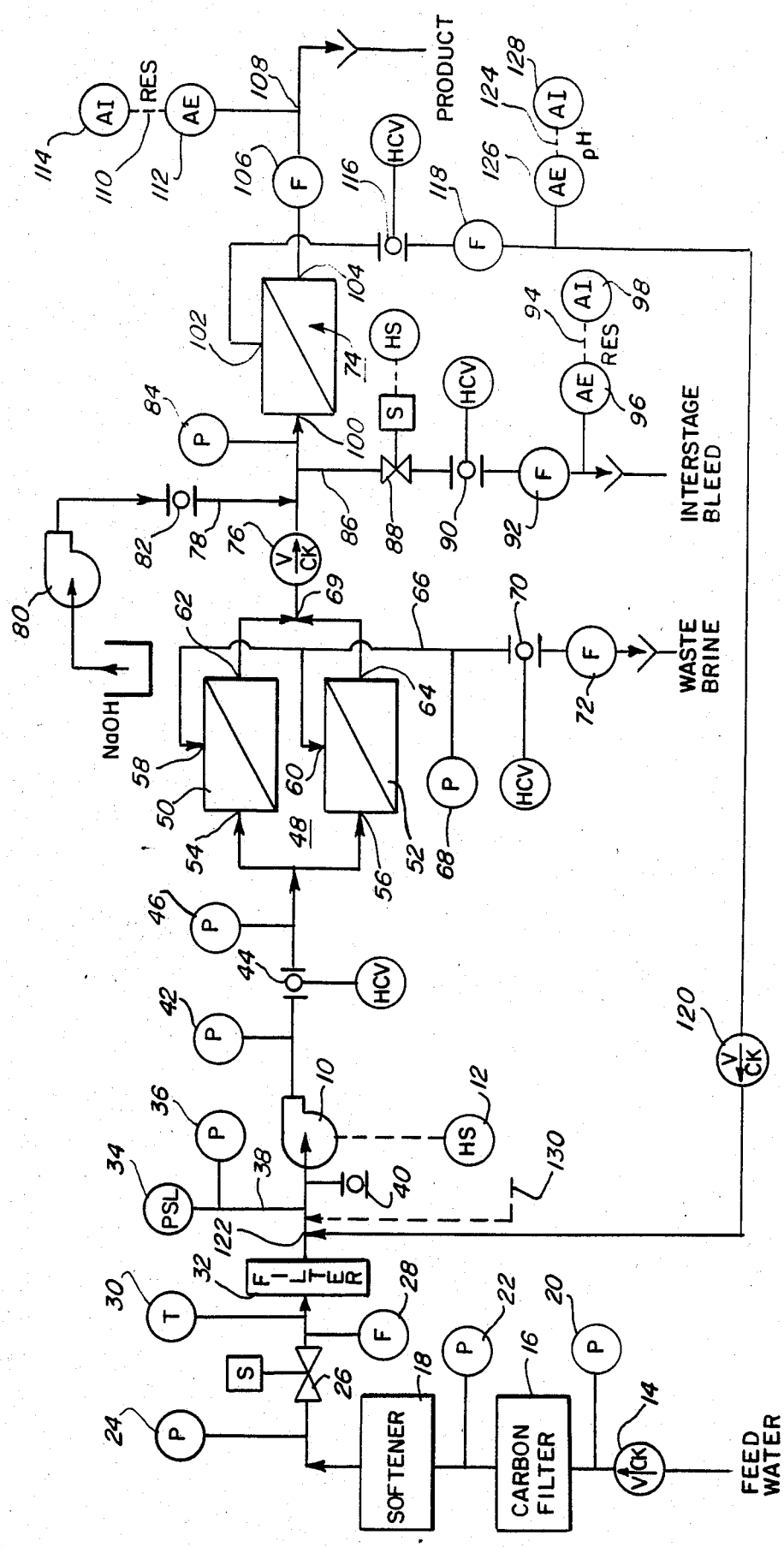

REVERSE OSMOSIS SYSTEM

BACKGROUND OF THE INVENTION

The present invention concerns a novel system and process for separating impurities from water using reverse osmosis membranes.

The process of reverse osmosis is currently in widespread use for the treatment of water. Its value is derived from the ability of a semipermeable membrane to preferentially reject the passage of most salts, a high percentage of organic contaminants, and nearly all particulate matter. The process, as it is typically designed and operated, has limitations though, in that both the dissolved salt and organic passage is too great for the process to be used as a stand-alone treatment, and the seals separating the raw and treated water sides of the membrane are not sufficiently reliable to assure consistently high rejection of particulates.

Additionally, it is customary, and in many cases imperative, to pretreat the water supply ahead of reverse osmosis to avoid fouling of membrane surfaces. Doing so in many cases limits the performance of the unit because the required pretreatment can reduce the ability of the membranes to reject contaminants.

In the majority of raw water supplies, calcium and alkalinity levels are sufficiently high that direct treatment by reverse osmosis would cause precipitation of calcium carbonate on membrane surfaces, reducing productivity. To avoid precipitation, pretreatment by softening, or by acid addition, is practiced. Both processes reduce the effectiveness of the reverse osmosis membrane. When softening is employed, the divalent ions of calcium and magnesium are exchanged for the monovalent ion sodium. Sodium is not as well rejected by the membrane, thus the treated water salt level is increased and the cost of further removal of dissolved solids downstream of the reverse osmosis system is increased. If acid is added to reduce alkalinity, the alkalinity is converted to carbonic acid, which passes freely through the membrane and thus also increases the cost of downstream treatment.

It is an object of the present invention to provide a system and process which significantly alleviates the aforementioned difficulties.

Another object of the present invention is to provide a system and process for purifying water that is relatively low in cost and simple to produce and use.

A further object of the present invention is to provide a water purification system and process, using reverse osmosis techniques, that is reliable in operation and achieves high particle rejection.

A still further object of the present invention is to provide a reverse osmosis type water purification system and process which enables the operator to tailor the system and process to performance improvement.

Other objects and advantages of the present invention will become apparent as the description proceeds.

SUMMARY OF THE INVENTION

In accordance with the present invention, a reverse osmosis water purification system is provided. The system includes a first reverse osmosis unit having an inlet, a product outlet and a brine outlet. Means are provided for pumping water to be purified to the inlet of the first reverse osmosis unit. A second reverse osmosis unit is provided in series with the first reverse osmosis unit and downstream therefrom. The second reverse osmosis unit has an inlet, a product outlet and a brine outlet. A conduit couples the product outlet of the first reverse osmosis unit to the inlet of the second reverse osmosis unit.

Means are provided for treating the product from the first reverse osmosis unit at a location upstream of the second reverse osmosis unit. Means are provided for directing the product from the second reverse osmosis unit toward a point of use or storage for purified water.

In the illustrative embodiment, an ion exchange type water softener is provided upstream of the first reverse osmosis unit for conditioning the water to be purified. the treating means referred to above comprises introducing a solution having a pH that exceeds 7, such as a sodium hydroxide solution. The pumping means comprises a pump located upstream of the first reverse osmosis unit.

In the illustrative embodiment, a carbon filter is located upstream of the water softener and a 5 micron cartridge filter is located downstream of the water softener and upstream of the pumping means. The brine outlet of the second reverse osmosis unit is coupled to the water flow line upstream of the first reverse osmosis unit by a recirculation conduit.

The water purification process of the present invention comprises the steps of providing a first reverse osmosis unit having an inlet, a product outlet and a brine outlet; providing a second reverse osmosis unit having an inlet, a product outlet and a brine outlet; locating the second reverse osmosis unit downstream of the first reverse osmosis unit with the product outlet of the first reverse osmosis unit being coupled to the inlet of the second reverse osmosis unit; pumping water to be purified to the inlet of the first reverse osmosis unit; treating agent into the product from the first reverse osmosis unit at a location upstream of the second reverse osmosis unit; and directing the product from the second reverse osmosis unit toward a point of use or storage for purified water.

In the illustrative embodiment, the process includes the step of conditioning the water to be purified upstream of the first reverse osmosis unit and recirculating the brine from the brine outlet of the second reverse osmosis unit back to the water flow line upstream of the first reverse osmosis unit.

A more detailed explanation of the invention is provided in the following description and claims, and is illustrated in the accompanying drawing.

BRIEF DESCRIPTION OF THE DRAWING

The drawing FIGURE is a schematic flow diagram of a reverse osmosis water purification system constructed in accordance with the principles of the present invention.

DETAILED DESCRIPTION OF THE ILLUSTRATIVE EMBODIMENTS

Referring to the drawing, a reverse osmosis water purification system is shown therein, including a pump 10, connected to an on/off/automatic hand switch 12 which is used to pump, through the system, feed water from a municipal water supply or the like. The feed water flows through a check valve 14, a carbon filter 16, and the water is conditioned by an ion exchange resin type water softener 18. Pressure gauges 20, 22 and 24 are located, respectively, upstream of carbon filter 16, between carbon filter 16 and softener 18, and downstream of softener 20. Pressure gauge 24 is used to check that there is adequate pressure upstream of pump 10 in order to provide adequate net positive suction head.

A solenoid valve 26 is connected in the water line to shut down flow when the system is off. A flow indicator 28 is provided to check flow in order to get a complete water balance across the system. A temperature indicator 30 is provided to check the temperature of the water in order to correct the performance of the downstream reverse osmosis membranes since the performance of the membranes will vary in response to the temperature of the water.

A 5 micron cartridge filter 32 is provided to reduce the level of suspended solids in the water to the reverse osmosis membranes, thus alleviating the possibility that fouling by suspended solids will cause erroneous readings in performance.

Downstream of the cartridge filter 32 there is a low pressure switch 34 which operates if the pressure goes below a predetermined amount. A pressure gauge 36 is in line with low pressure switch 34 to monitor pressure in the low pressure switch line 38. A ball valve 40 is provided to enable sampling of the water in order to measure the water quality. The next item downstream is pump 10, shown connected to hand switch 12. The hand switch has three functions: on, off or automatic.

Downstream of pump 10 there is another pressure gauge 42 to measure the output from pump 10. Downstream of pressure gauge 42 is hand-controlled ball valve 44, which allows adjusting the pressure of water to the first stage reverse osmosis unit. Another pressure valve 46 is provided to indicate the pressure of the first stage reverse osmosis unit.

The first stage reverse osmosis unit 48 comprises a pair of parallel connected reverse osmosis membrane units 50 and 52. Inlet 54 of reverse osmosis membrane unit 50 and inlet 56 of reverse osmosis membrane unit 52 are connected together. Likewise, brine outlet 58 of reverse osmosis membrane unit 50 and brine outlet 60 of reverse osmosis membrane unit 52 are connected together. Likewise, product outlet 62 of reverse osmosis membrane unit 50 and product outlet 64 of reverse osmosis unit 52 are connected together. Although no limitation is intended, reverse osmosis unit 50 comprises two Film-Tec BW30-4040 reverse osmosis modules. Likewise, reverse osmosis unit 52 comprises two Film-Tech BW30-4040 modules. It can thus be seen that in this embodiment, the first reverse osmosis unit 48 comprises four reverse osmosis modules, in order to obtain optimum water flow for the downstream system.

Although no limitation is intended, the flow rate at flow meter 28 is preferably about 12 gpm, the pressure at the pressure gauge 42 is preferably 475 psig, the water at inlet 54 preferably has a flow rate of 6 gpm and a pressure of 450 psig and the water at inlet 56 preferably has a flow rate of 6 gpm and a pressure of 450 psig.

Brine outlets 58 and 60 are coupled to waste line 66 having a pressure gauge 68 in the line and also having a hand-controlled ball valve 70 and flow indicator 72 in the line.

The product water outlets 62 and 64, which are connected together at point 69, are directed toward a second reverse osmosis unit 74 through a check valve 76. At point 69 the water is preferably flowing at 3.3 gpm with a pressure of 225 psig.

Second reverse osmosis unit 74 preferably comrpises two Film-Tec BW30-4040 reverse osmosis modules. Downstream of check valve 76 but upstream of reverse osmosis module 74 there is provided the introduction of a chemical treatment agent via line 78. The chemical treatment agent is pumped through line 78 by pump 80 and through a shutoff valve 82.

It is preferred that the chemical treatment agent be a base, i.e., a solution having a pH greater than 7. A 20 percent sodium hydroxide solution has been found most advantageous. The primary purpose for the sodium hydroxide solution is as follows. I have discovered that treatment of water with two reverse osmosis units in series will not provide water that is twice as high in quality as using one reverse osmosis module. This is because the sodium bicarbonate from the upstream treatment of the water going to the first reverse osmosis unit 48, disassociates into sodium carbonate and carbon dioxide. Although the disassociation is normally less than 10 percent, there is still an appreciable amount of carbon dioxide provided. The carbon dioxide passes through the reverse osmosis membrane. Thus, any carbon dioxide which is generated is not removed but is present in the treated water. By placing a second reverse osmosis unit in series with the first reverse osmosis unit, the carbon dioxide passing the first reverse osmosis unit will also pass the second reverse osmosis unit. However, by adding sodium hydroxide the carbon dioxide is converted back to bicarbonate and preferably back to carbonate. Carbonate is rejected more readily by the reverse osmosis membrane than is bicarbonate. By converting the carbon dioxide to carbonate, a substantially improved performance is achieved.

Other bases may be used for removing the carbon dioxide. For example, sodium carbonate may be used although this solution would not remove as much of the carbon dioxide as sodium hydroxide would remove. Trisodium phosphate may be used and may outperform the sodium hydroxide solution, but trisodium phosphate is more expensive than sodium hydroxide.

In addition to the conversion of the carbon dioxide to carbonate, the introduction of sodium hydroxide will also ionize certain otherwise difficult to remove chemical compounds, most notably silica and various organics. Silica is normally not ionized below a pH of approximately 9.5. Since it is not ionized, it is not as well rejected by the reverse osmosis membrane. However, by use of the sodium hydroxide solution, raising the pH above 9.5 the silica can be ionized, thus increasing its rejection by the reverse osmosis membrane and reducing the level of silica in the treated water.

Similarly, organic molecules that are known to be present and difficult to remove from water supplies include a large variety of carboxilic acids. Carboxilic acids will ionize at various pH levels, all above 5, but an increasing percentage of them will ionize as the pH is increased. By addition of the sodium hydroxide, a much larger percentage of the organic molecules will be ionized as compared with a system without the sodium hydroxide addition.

Again, other solutions may be useful. Other bases, such as sodium bicrabonate, sodium carbonate, disodium phosphate, trisodium phosphate, ammonium hydroxide, potassium hydroxide, calcium hydroxide and magnesium hydroxide may be utilized.

A pressure gauge 84 is located upstream of second reverse osmosis unit 74 in order to check the pressure of this stage.

Slightly downstream of chemical treatment line 78 there is an interstage bleed line 86. The interstage bleed line includes a solenoid valve 88 controlled by a twoposition hand switch (open/automatic). In series with solenoid valve 88 is a hand-controlled ball valve 90 and a flow indicator 92. Downstream of flow indicator 92 is a resistivity monitor 94, comprising an analysis element 96 and an analysis indicator 98. The resistance of the water varies in accordance with the ionic contamination and resistivity monitor 94 provides an instantaneous readout of performance.

The interstage bleed line 86 insures that the pressure downstream of the first stage will never exceed the pressure upstream of the first stage so that there is always a pressure drop across the first reverse osmosis unit 48. If the pressure drop were not maintained, the reverse osmosis membranes may be damaged because they are built to sustain a pressure drop in only one direction.

There is no pump needed downstream of the first reverse osmosis unit 48. In this manner, the flow rate and pressure of the product water from the first reverse osmosis unit 48 entering the inlet of the second reverse osmosis unit 74 will be substantially the same as the flow rate and pressure at point 69. By using only upstream pump 10, the cost and complexity of the system is reduced materially.

Second reverse osmosis unit 74 comprises an inlet 100, a brine outlet 102, and a product water outlet 104. The water at inlet 100 is preferably flowing at 3.3 gpm with a pressure of 225 psig. The product water from the second stage flows through a flow meter 106 at, preferably, 1 gpm and is directed via conduit 108 to a point of use or storage for the purified water. Resistance monitor 110 is provided in line 108 in order to measure the resistance of the water, which varies in accordance with the ionic contamination as described above. Resistance monitor 110 comprises an analysis element 112 and an analysis indicator 114.

The brine from brine outlet 102 of second reverse osmosis unit 74 is recirculated. To this end, brine outlet 102 is coupled through a hand-controlled ball valve 116, a flow indicator 118 and a check valve 120 to a point 122 that is upstream of pump 10 but downstream of filter 32, as illustrated. The pH of the brine is monitored by pH monitor 124 comprising an analysis element 126 and an analysis indicator 128.

I have discovered that if the system is used for removal of organic impurities of water, and if these organics are of a mixed variety containing both basic and acidic types, it is preferred that the pH before the first stage be adjusted to below about 5, preferably below 4, and the pH before the second stage be adjusted to above 9.

If the system is applied to the production of electronics grade water, the appropriate pretreatment upstream of the first stage is softening. In this manner, precipitation of calcium carbonate is avoided, and passage of carbon dioxide is lowest. Prior to the second stage, the sodium hydroxide is introduced, converting the carbon dioxide from the first stage to carbonate, ionizing silica, ionizing some organic material, and causing chloride to be replaced with hydroxide as the prevalent anion in the second stage product. An improvement in second stage resistivity, silica rejection, organic rejection, and anion load on subsequent treatment is obtained as compared with a double stage reverse osmosis system operated without caustic solution.

Although an illustrative embodiment of the invention has been shown and described, it is to be understood that various modifications and substitutions may be made by those skilled in the art without departing from the novel spirit and scope of the present invention. For example, instead of using softener 18, the water could be pretreated with dealkalization. For this purpose, an acid feed with a forced draft degasifier may be used, or a chloride form anion exchange resin may be used. Alternatively, it may be desirable to eliminate the use of a softener as a dealkalizer.

As another example, by itself or with other treatments it may be desirable to treat the water upstream of the first reverse osmosis unit by adding a chemical from conduit 130 that would adjust the pH of the water.

It should also be noted that the chemical treatment at any point may not be a treatment using a single chemical but instead may be a treatment using a combination of chemicals designed to buffer the water to a selected pH. Further, a chemical may be fed for the purpose of achieving bacteriostatic conditions rather than improving the removal of contaminants.

It should also be noted that the chemical treatment agent in line 78 intermediate the reverse osmosis stages could be an agent for either raising or lowering the pH of the product water from point 69. Additional treatments after the first reverse osmosis unit 48 but before the second reverse osmosis unit 74 may include an ion exchange process such as dealkalization, mixed bed demineralization or two-bed demineralization; it may include electrodialysis, sub-micron filtration, carbon adsorption, or chemical deaeration.

What is claimed is:

1. A water purification process for removing dissolved solids of the type that are normally present in a municipal water supply or the like, which comprises the steps of:

providing a first reverse osmosis unit having an inlet, a product outlet and a brine outlet;

providing a second reverse osmosis unit having an inlet, a product outlet and a brine outlet;

locating said second reverse osmosis unit downstream of said first reverse osmosis unit with the product outlet of said first reverse osmosis unit being coupled to the inlet of said second reverse osmosis unit;

providing water to be purified to the inlet of said first reverse osmosis unit;

treating the product from said reverse osmosis unit at a location upstream of said second reverse osmosis unit with a chemical treatment agent comprising a solution having a pH that exceeds 7 to reduce carbon dioxide concentration of the product by chemical conversion and to ionize certain otherwise difficult to remove chemicals; and directing the product from said second reverse osmosis unit toward a point of use or storage for purified water.

2. A process as described in claim 1, including the step of conditioning the water to be purified upstream of said first reverse osmosis unit.

3. A process as described in claim 1, in which said treating step comprises introducing a solution from the group consisting of sodium hydroxide, sodium bicarbonate, sodium carbonate, disodium phosphate, trisodium phosphate, ammonium hydroxide, potassium hydroxide, calcium hydroxide and magnesium hydroxide.

4. A process as described in claim 1, including the step of recirculating the brine from the brine outlet of said second reverse osmosis unit back to the water flow line upstream of said first reverse osmosis unit.

5. A process as described in claim 1, including the step of bleeding the product downstream of said treatment but upstream of said second reverse osmosis unit.

6. A process as described in claim 1, including the step of treating the water to be purified upstream of said reverse osmosis unit to adjust its pH to below about 5.

7. A process as described in claim 1, including said treating step comprising the step of adjusting the pH of the product water from said first reverse osmosis unit to above about 9.

8. A water purification process for removing dissolved solids of the type that are normally present in a municipal water supply or the like, which comprises the steps of:
   providing a first reverse osmosis unit having an inlet, a product outlet and a brine outlet;
   providing a second reverse osmosis unit having an inlet, a product outlet and a brine outlet;
   locating said second reverse osmosis unit downstream of said first reverse osmosis unit with the product outlet of said first reverse osmosis unit being coupled to the inlet of said second reverse osmosis unit;
   pumping water to be purified to the inlet of said first reverse osmosis unit;
   treating the water to be purified upstream of said first reverse osmosis unit to adjust the pH to below about 5;
   introducing a chemical treatment agent into the product from said reverse osmosis unit to adjust its pH to below about 5;
   introducing a chemical treatment agent into the product from said first reverse osmosis unit at a location upstream of said second reverse osmosis unit to adjust the pH of the product water from said first reverse osmosis unit to above about 9 to reduce carbon dioxide concentration of the product by chemical conversion and to ionize certain otherwise difficult to remove chemicals; and
   directing the product from said second reverse osmosis unit toward a point of use or storage for purified water.

9. A process as described in claim 8, including the steps of:
   recirculating the brine from the brine outlet of said second reverse osmosis unit back to the water flow line upstream of said first reverse osmosis unit; and
   bleeding the product downstream of the chemical treatment agent introduction but upstream of said second reverse osmosis unit.

10. A water purification process for removing dissolved solids of the type that are normally present in a municipal water supply or the like, which comprises the steps of:
   providing a first reverse osmosis unit having an inlet, a product outlet and a brine outlet;
   providing a second reverse osmosis unit having an inlet, a product outlet and a brine outlet;
   locating said second reverse osmosis unit downstream of said first reverse osmosis unit with the product outlet of said first reverse osmosis unit being coupled to the inlet of said second reverse osmosis unit;
   providing water to be purified to the inlet of said first reverse osmosis unit;
   treating the product from said first osmosis unit at a location upstream of said second reverse osmosis unit with a chemical treatment agent comprising a solution having a pH that exceeds 7 to reduce carbon dioxide concentration of the product by chemical conversion and to ionize certain otherwise difficult to remove chemicals;
   said second reverse osmosis unit inlet receiving product water from said first reverse osmosis unit product outlet at substantially the same flow rate and pressure as the flow rate and pressure of the product water from said reverse osmosis unit product outlet; and
   directing the product from said second reverse osmosis unit toward a point of use or storage for purified water.

* * * * *

UNITED STATES PATENT AND TRADEMARK OFFICE
CERTIFICATE OF CORRECTION

PATENT NO. : B1-4,574,049
DATED : February 2, 1999
INVENTOR(S) : Gregory A. Pittner It is certified that error appears in the above-identified patent and that said Letters Patent is hereby corrected as shown below:

Claim 2, column 1, line 52, replace "12" with --11--.

Claim 3, column 1, line 55, replace "12" with --11--.

Claim 4, column 1, line 61, replace "12" with --11--.

Claim 5, column 1, line 65, replace "12" with --11--.

Claim 6, column 2, line 1, replace "12" with --11--.

Claim 7, column 2, line 4, replace "12" with --11--.

Signed and Sealed this

Eighteenth Day of May, 1999

Attest:

Q. TODD DICKINSON

*Attesting Officer*  *Acting Commissioner of Patents and Trademarks*

REEXAMINATION CERTIFICATE (3714th)
United States Patent [19]

Pittner

[11] B1 4,574,049

[45] Certificate Issued Feb. 2, 1999

[54] REVERSE OSMOSIS SYSTEM

[75] Inventor: Gregory A. Pittner, Danville, Calif.

[73] Assignee: U.S. Filter/Ionpure, Inc., Lowell, Mass.

Reexamination Request:
No. 90/004,422, Oct. 18, 1996

Reexamination Certificate for:
Patent No.: 4,574,049
Issued: Mar. 4, 1986
Appl. No.: 616,729
Filed: Jun. 4, 1984

[51] Int. Cl.[6] ............................................. B01D 61/00
[52] U.S. Cl. .................. 210/639; 210/641; 210/195.2; 210/433.1; 210/259; 210/206; 210/321.6
[58] Field of Search ........................ 210/639, 641, 210/195.2, 433.1, 259, 321.6, 206, 652, 653

[56] References Cited

U.S. PATENT DOCUMENTS 4,392,959   7/1983   Coillet ................................. 210/638

FOREIGN PATENT DOCUMENTS

| 1792304 | 8/1975 | Germany . |
|---|---|---|
| 2607 737 A1 | 9/1976 | Germany . |
| A-50/75987 | 6/1975 | Japan . |
| A-53/4777 | 1/1978 | Japan . |
| A-54/69579 | 4/1979 | Japan . |
| A-54/83688 | 7/1979 | Japan . |
| A-56/139106 | 10/1981 | Japan . |
| A-58/118538 | 7/1983 | Japan . |
| A-58/122084 | 7/1983 | Japan . |

OTHER PUBLICATIONS

Zosui Gijutsu (Water Producing Technology) vol. 10, No. 2, 13–22 (1984).
Handbook of Membrane Technology, 26–28, Jul. 15, 1983.
Annual Research Report No. 42, Shikoku Electric Power Co., Ltd., Sep. 1983.
Industrial Water Engineering vol. 13, No. 6, 12–15 (1977).
Handbook of Membrane Technology 184–198, Jul. 145, 1985.
Permasep Engineering Manual, E.I. du Pont de Nemours & Co. (1982).
Handbook of Water Purification/ed. Walter Lorch—London |etc.| MacGraw-Hill cop. 1981. XVIII, 715 p. iii. 26 cm.
1982 Report on Technological Development For Boiler Water by Reverse Osmosis, Exhibit Ko No. 1, Mar., 1983, Fresh Water Generation Promotion Center, pp. 1–11, 45–97.
FILMTEC® Membranes 4" Brackish Water Element Specifications, Tech. Bulletin, (Jan.84), FilmTec Corp.
Description of the FT–30 Membrane, Tech. Bulletin, (Feb. 1982), FilmTec Corp.
Crabbe, A Double Pass Reverse Osmosis System, (Dec. 76/Jan.77), pp. 12–15, Industrial Water Engineering.
U.S. Dept. of Commerce NTIS report PB83–243170, Lee et al., Novel Composite Membranes, Apr. 1983 Selected Water Resources Abstracts.
Nakamura, Seawater Desalination by Reverse Osmosis Process, Jul./Aug. 1981, pp. 35–45, Chemical Economy & Engineering Review, vol. 13, No. 7–8 (No. 150).
Larson et al., Development of the FT–30 Thin–Film Composite Membrane for Brackish Water Desalting Applications, Presented at the National water Supply Improvement Association Ninth Annual Conference and International Trade Fair, Washington, D.C., May 31–Jun. 4, 1981.

(List continued on next page.)

*Primary Examiner*—Ana Fortuna

[57] ABSTRACT

A chemically enhanced reverse osmosis water purification system and process is provided in which the inlet of a second reverse osmosis unit is coupled in series to the product water outlet of a first reverse osmosis unit. Water to be purified is conditioned by an ion exchange resin type water softener and pumped to the inlet of the first reverse osmosis unit. The product from the first reverse osmosis unit is treated with a chemical treatment agent, such as a sodium hydroxide solution, upstream of the inlet to the second reverse osmosis unit. The brine from the brine outlet of the second reverse osmosis unit is recirculated to the water flow line upstream of the first reverse osmosis unit.

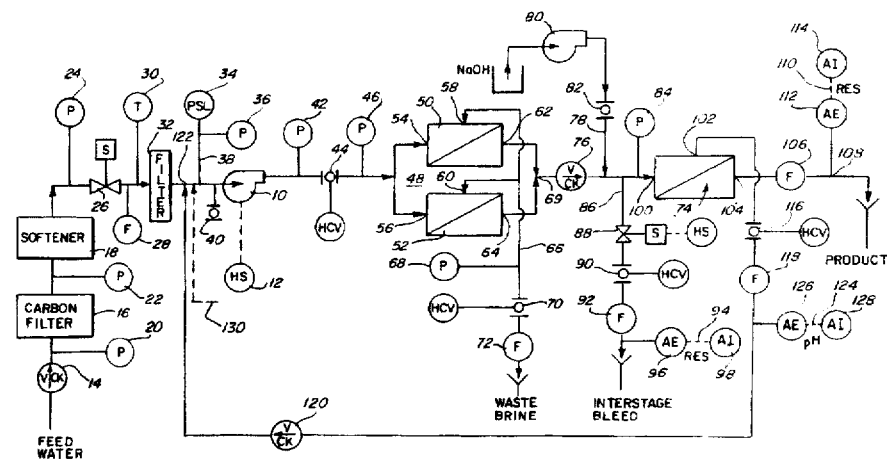

OTHER PUBLICATIONS

Petersen et al., Development of the FT-30 Thin-Film Composite Membrane for Desalting Applications, Presented at the National Water Supply Improvement Association Eighth Annual Conference and International Trade Fair, San Francisco, California, Jul. 6-10, 1980.

Peterson et al., Industrial Applications of the FT-30 Reverse Osmosis Membrane, World Filtration Congress III, pp. 541-547.

Larson et al, The FT-30 Seawater Reverse Osmosis Membrane—Element Test Results, (1981), pp. 473- Desalination, 38, Elsevier Scientific Publishing Company.

Milstead et al., Rejection of Carbon Dioxide and pH Effects in Reverse Osmosis Desalination, (1971), pp. 217-213, Desalination, 9.

Final Report on Development of FT-30 Membranes in Spiral Wound Modules, Contract No. 14-34-0001-8547, Oct. 1982, FilmTec Corporation.

Allegrezza, Jr. A., "Commercial Reverse Osmosis Membranes and Modules" Reverse Osmosis Technology, pp. 53-101, Marcel Deckker, Inc., 1988.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 34–50:

The first stage reverse osmosis unit 48 comprises a pair of parallel connected reverse osmosis membrane units 50 and 52. Inlet 54 of reverse osmosis membrane unit 50 and linlet 56 of reverse osmosis membrane unit 52 are connected together. Likewise, brine outlet 58 of reverse osmosis membrane unit 50 and brine outlet 60 of reverse osmosis membrane unit 52 are connected together. Likewise, product outlet 62 of reverse osmosis membrane unit 50 and product outlet 64 of reverse osmosis unit 52 are connected together. Although no limitation is intended, reverse osmosis unit 50 comprises two Film-Tec BW30-4040 reverse osmosis modules *(available from Dow Chemical Company, Midland, Mich.), which include thin-film composite reverse osmosis membranes*. It can thus be seen that in this embodiment, the first reverse osmosis unit 48 comprises four reverse osmosis modules, in order to obtain optimum water flow for the downstream system.

Column 3, lines 66 through column 4, line 4:

Second reverse osmosis unit 74 preferably comprises two Film-Tec BW30-4040 reverse osmosis modules *having the thin-film composite reverse osmosis membranes described above*. Downstream of check valve 76 but upstream of reverse osmosis module 74 there is provided the introduction of a chemical treatment agent via line 78. The chemical treatment agent is pumped through line 78 by pump 80 through a shutoff valve 82.

AS A RESULT OF REEXAMINATION, IT HAS BEEN DETERMINED THAT:

The patentability of claims 8 and 9 is confirmed.

Claims 1 and 10 are cancelled.

Claims 2–7 are determined to be patentable as amended.

New claims 11–17 are added and determined to be patentable.

2. [A] *The* process as described in claim [1] *12*, including the step of conditioning the water to be purified upstream of said first reverse osmosis unit.

3. [A] *The* process as described in claim [1] *12*, in which said treating step comprises introducing a solution from the group consisting of sodium hydroxide, sodium bicarbonate, sodium carbonate, disodium phosphate, trisodium phosphate, ammonium hydroxide, potassium hydroxide, calcium hydroxide and magnesium hydroxide.

4. [A] *The* process as described in claim [1] *12*, including the step of recirculating the brine from the brine outlet of said second reverse osmosis unit back to the water flow line upstream of said first reverse osmosis unit.

5. [A] *The* process as described in claim [1] *12*, including the step of bleeding the product downstream of said treatment but upstream of said second reverse osmosis unit.

6. [A] *The* process as described in claim [1] *12*, including the step of treating the water to be purified upstream of said first reverse osmosis unit to adjust its pH to below about 5.

7. [A] *The* process as described in claim [1] *12*, including said treating step comprising the step of adjusting the pH of the product water from said first reverse osmosis unit to above about 9.

*11. A water purification process for removing dissolved solids that are normally present in a municipal water supply, which comprises the steps of:*

*providing a first reverse osmosis unit having an inlet, a product outlet, and a brine outlet;*

*providing a second reverse osmosis unit having an inlet, a product outlet, a brine outlet and reverse osmosis modules having thin-film composite membranes;*

*locating said second reverse osmosis unit downstream of said first reverse osmosis unit with the product outlet of said first reverse osmosis unit being coupled to the inlet of said second reverse osmosis unit;*

*providing water to be purified to the inlet of said first reverse osmosis unit;*

*treating the product from said first reverse osmosis unit at a location upstream of said second reverse osmosis unit with a chemical treatment agent comprising a solution having a pH that exceeds 7 to adjust the pH of the product from said first reverse osmosis unit to a basic pH to thereby reduce carbon dioxide concentration of the product by chemical conversion and to ionize certain otherwise difficult to remove chemicals; and*

*directing the product from said second reverse osmosis unit toward a point of use or storage for purified water.*

*12. A water purification process for removing dissolved solids that are normally present in a municipal water supply, which comprises the steps of:*

*providing a first reverse osmosis unit having an inlet, a product outlet and a brine outlet;*

*providing a second reverse osmosis unit having an inlet, a product outlet and a brine outlet;*

*wherein said first and second reverse osmosis units includes reverse osmosis modules with thin-film composite membranes;*

*locating said second reverse osmosis unit downstream of said first reverse osmosis unit with the product outlet of said first reverse osmosis unit being coupled to the inlet of said second reverse osmosis unit;*

*providing water to be purified to the inlet of said first reverse osmosis unit;*

*treating the product from said first reverse osmosis unit at a location upstream of said second reverse osmosis unit with a chemical treatment agent comprising a solution having a pH that exceeds 7 to adjust the pH of the product from said first reverse osmosis unit to a basic pH to thereby reduce carbon dioxide concentration of the product by chemical conversion and to ionize certain otherwise difficult to remove chemicals; and*

*directing the product from said second reverse osmosis unit toward a point of use or storage for purified water.*

*13. The process as described in claim 12 including the step of conditioning the water to be purified upstream of said first reverse osmosis unit.*

*14. The process as described in claim 12, in which said treating step comprises introducing a solution from the group consisting of sodium hydroxide, sodium bicarbonate, sodium carbonate, disodium phosphate, trisodium phosphate, ammonium hydroxide, potassium hydroxide, calcium hydroxide and magnesium hydroxide.*

15. The process as described in claim 12 including the step of recirculating the brine from the brine outlet of said second reverse osmosis unit back to the water flow line upstream of said first reverse osmosis unit.

16. The process as described in claim 12 including the step of bleeding the product downstream of said treatment but upstream of said second reverse osmosis unit.

17. The process as described in claim 12 including said treatment step comprising the step of adjusting the pH of the product water from said first reverse osmosis unit to above about 9.

* * * * *